United States Patent
Walkowc

[19]

[11] Patent Number: 5,678,460
[45] Date of Patent: *Oct. 21, 1997

[54] ACTIVE TORSIONAL VIBRATION DAMPER

[75] Inventor: Janusz Walkowc, Cordova, Tenn.

[73] Assignee: Stahl International, Inc., Memphis, Tenn.

[*] Notice: The term of this patent shall not extend beyond the expiration date of Pat. No. 5,553,514.

[21] Appl. No.: 660,343

[22] Filed: Jun. 4, 1996

Related U.S. Application Data

[63] Continuation of Ser. No. 254,123, Jun. 6, 1994, Pat. No. 5,553,514.

[51] Int. Cl.$^6$ ............................................. F16F 15/10
[52] U.S. Cl. ........................ 74/574; 74/572; 73/1 DV
[58] Field of Search .................... 74/572–574; 73/1 DV, 73/11.05, 578, 650; 123/192.1; 226/190; 310/323

[56] References Cited

U.S. PATENT DOCUMENTS

| | | | |
|---|---|---|---|
| 2,767,367 | 10/1956 | Black | 32/32 |
| 3,054,284 | 8/1962 | Ciringione et al. | |
| 3,450,911 | 6/1969 | Smith | 74/572 |
| 3,558,936 | 1/1971 | Horan | |
| 3,693,402 | 9/1972 | Jones | |
| 3,801,072 | 4/1974 | Vasiliev et al. | |
| 4,128,020 | 12/1978 | Gray | 74/572 |
| 4,265,386 | 5/1981 | Levy et al. | |
| 4,326,158 | 4/1982 | Helgesen | |
| 4,922,869 | 5/1990 | Kadomukai et al. | |
| 4,995,138 | 2/1991 | Suzuki | |
| 5,056,487 | 10/1991 | Yamakado et al. | |
| 5,185,543 | 2/1993 | Tebbe | |
| 5,303,681 | 4/1994 | Crofts | |
| 5,465,635 | 11/1995 | Kono et al. | |

OTHER PUBLICATIONS

Korane; Machine Design–putting ER Fluids to work; pp. 52–60; May 9, 1991.
Morishita et al.; Automotive Engineering—ER Fluid Engine Mounts; pp. 52–55; Feb., 1993.
Petek; Automotive Engineering—Shock Absorber uses electrorheological fluid; pp. 27–30; Jun., 1992.
TRW, Inc.; Automotive Engineering—Active Damping using ERM fluids; pp. 19–23;Jun., 1993.
Phelan; Ward's Auto World—Materials, Fluids Pack Punch; pp. 95–96; Feb., 1987.

*Primary Examiner*—Vinh T. Luong
*Attorney, Agent, or Firm*—Liell & McNeil

[57] ABSTRACT

A resonance torsional vibration damping system includes a member having at least one node location along its length. An energy exchanging device, such as a fly wheel and eddy current brake, is operably connected to the member at a damping location that is a distance away from the at least one node location. The energy exchanging device is capable of imparting a plurality of successive torsional impulses to the member. A suitable sensor, such as an angular amplitude sensor or a torsional stress sensor, is utilized to detect the presence of a resonance torsional vibration in the member. A computer is in communication with the energy exchanging device and the sensor, and is capable of controlling the energy exchanging device.

18 Claims, 7 Drawing Sheets

ACTIVE TORSIONAL VIBRATION DAMPER

RELATION TO OTHER APPLICATION

This application is a continuation of earlier filed application Ser. No. 08/254,123, filed Jun. 6, 1994, now U.S. Pat. No. 5,553,514 issued Sep. 10, 1996.

BACKGROUND OF THE INVENTION

The present invention relates generally to torsional vibration dampers, and more particularly to an automated active damping system for damping resonance torsional vibrations in a member capable of transmitting a torque.

In almost all systems in which torque is transmitted via a rotating shaft, such as an engine, pump, compressor, etc., the shaft is subject to fatigue failure due to the long term presence of torsional vibrations. The same can be said for stationary members of a system that are capable of transmitting a torque, which also makes them subject to the detrimental effects of torsional vibrations. As a result of the mass properties, every member capable of transmitting a torque, whether it be stationary member, a gear or a rotating shaft, has a number of natural torsional frequencies which are capable of excitation. Each natural frequency corresponds to a resonance mode of the member. For example, in a mode one vibration, the ends of a member twist back and forth with respect to each other while a single node location along the length of the shaft remains untwisted. In the case of a rotating shaft, this twisting motion is superimposed on the mean rotational speed of the shaft. In a mode two vibration, two node locations are located along the length of the member that remain untwisted. These node locations can be determined for a given system either empirically or by approximation using available software tools.

In one example application, such as some automotive drivelines, only lower mode resonance torsional vibrations are of concern since they naturally occur in relatively larger amplitudes. Higher modes are usually of lesser concern because they generally occur with relatively small amplitudes that a properly engineered driveline can withstand without significant damage. In some vehicle drivelines, the crank shaft of the vehicle's internal combustion engine has as many as nine resonance modes that are excitable over the operating range of the engine in magnitudes sufficient to induce fatigue stress. Because of the trend to reduce weight in engines, torsional vibrations are becoming more of a concern to automotive engineers. This weight reduction renders the individual components more sensitive to torsional vibrations. In the past, resonance torsional vibrations were effectively ignored by automotive design engineers by utilizing increased component weight due to the relatively large design safety factors that increased component and overall weight. Motor vehicle drivelines are but one of a number of technologies that could benefit from a light weight torsional vibration damping system that is easily incorporated into the given machinery.

Although the lowest resonance mode generally has the largest vibration amplitude relative to the other modes, a resonance vibration in any of the modes can quickly grow sufficiently large in amplitude that the shaft, gear or other member may break or at least have its life shortened due to unnecessary torsional fatigue. New materials, such as new metallic alloys, may have effectively extended the fatigue life of certain high stress components, but material sciences cannot eliminate the long term fatigue problems caused by torsional vibrations. In most cases, resonance vibrations will shorten the life of a torque transmitting member and eventually result in a fatigue failure. In extreme cases, resonance torsional vibrations can grow so quickly in amplitude that the torque transmitting member literally tears itself and any attached machinery apart.

Fatigue failures in gears, rotating shafts and other torque transmitting members are most often attributable to the prolonged presence of one or more resonance mode torsional vibrations. The useful life of much machinery is often dictated by the fatigue life of its most critical torque transmitting member. For instance, in the case of an internal combustion engine, the crank shaft is often the first piece of machinery to break due to cyclical fatigue stress occurring at a node location along the length of the shaft. What is needed is a damping system that actively damps harmful resonance torsional vibrations below a threshold amplitude.

REVIEW OF PRIOR ART

Two apparently related patents, U.S. Pat. No. 4,922,869 to Kadomukai et al. and U.S. Pat. No. 5,056,487 to Yamakado et al., seek to prevent torsional vibrations by removing deviations from the mean torque in the crank shaft of an internal combustion engine. Both of these patents apparently assume that torsional vibrations in the crank shaft can be eliminated by canceling torque deviations created by the firing of each cylinder. Since even a tiny input at a proper frequency can excite a resonance torsional vibration in a rotating shaft, the system described in these patents can only be successful if the torque deviations inputted to the crank shaft can be exactly canceled. Unfortunately, in real world applications, exact cancellation cannot occur and some small periodic torsional impulses must always be present. When these small torsional impulses occur at one of the natural frequencies of the shaft, a harmful resonance vibration will develop. The approach to the problem of torsional vibrations described by Kadomukai and Yamakado is believed to be doomed to failure for the simple reason that they seek to control inputs to the system rather than responses of the system to inputs. In other words, these references fail to recognize that most potentially harmful torsional vibrations are the result of excited natural frequencies in the rotating shaft rather than torque surges caused by rhythmic combustion.

SUMMARY OF THE INVENTION

Unlike the prior art, the present invention recognizes that potentially damaging resonance torsional vibrations in a torque transmitting member can be controlled by the application of relatively small torsional impulses with precise timing at an appropriate location along the length of the member. The present invention contemplates both a method and a system for damping resonance torsional vibrations in a member capable of transmitting a torque, be it a gear, a rotating shaft or a stationary member connected between two masses. The method comprises the steps of detecting the presence of a resonance torsional vibration in the member, periodically estimating a proper time period to apply counter torsional impulses to the member at a damper location, and periodically imparting the counter torsional impulses to the member. The torsional impulses are of sufficient energy to damp the resonance torsional vibration.

In the system embodiment of the present invention, a flywheel that stores angular momentum is mounted about the spin axis of a member, such as a rotating shaft, that is capable of transmitting a torque. Some means is provided for rotating the flywheel relative to the member. A brake mounted to the member has the ability to momentarily couple the flywheel to the member. With each application of the brake, the relative rotation rate between the flywheel and the member is decreased, with the result being that a portion of the angular momentum of the flywheel is transferred to the member. Also included is a means for measuring the rotational speed of the member, and means for measuring the energy of a torsional vibration at a location along the length of the member. These measurements are fed to a computer that controls the application of the brake.

In another system embodiment of the invention, a rotatable mass having a moment of inertia is mounted within a housing attached to the torque transmitting member. A magnetorheological fluid is positioned between the inner wall of the housing and the outer wetted surface of the rotatable mass. The mass is free to rotate within the housing with respect to the member, except for the friction created by the viscosity of the magnetorheological fluid. Some means, such as an electromagnet, is provided for generating a magnetic field of sufficient strength to momentarily increase the shear strength of the magnetorheological fluid. Like the earlier embodiment, means for measuring the rotational speed of the member and means for measuring the energy of a torsional vibration are also included. Finally, a computer in communication with both measuring means controls the generating means.

In the broadest hardware sense, the invention includes an energy exchanging device operably connected to the torque transmitting member at a damping location. The device must be capable of exchanging energy with the member by imparting torsional impulses to the member of a sufficient magnitude and in a timing that damps the resonance torsional vibration. In the case of the apparatuses described above, the energy exchanging device consists of the rotating flywheel that is capable of being coupled to the torque transmitting member via the eddy current brake. In the second system embodiment, the energy exchanging device consists of the electromagnetic assembly, the magnetorheological fluid and the ring mass. In different applications both of the above described system embodiments are capable of damping the resonance torsional vibration by either adding energy to the torque transmitting member or by absorbing energy from the same. In its broadest hardware sense, the invention also includes a means for detecting a resonance vibration in the torque transmitting member. This detecting means could be as simple as a single sensor mounted at an appropriate location on the torque transmitting member. The damping system also requires a computer in communication with both the energy exchanging device and the detecting means, and also must have the capability of controlling the energy exchanging device.

One object of the present invention is to increase the useful life of pulse driven rotating shafts, gears, clutches, couplings and any other torque transmitting members.

Another object of the present invention is to control the magnitude of torsional resonance vibrations present in a member capable of transmitting a torque.

Still another object of the present invention is to damp harmful torsional vibrations in any member capable of transmitting torque.

DETAILED DESCRIPTION OF THE PREFERRED EMBODIMENTS

Figure 1:
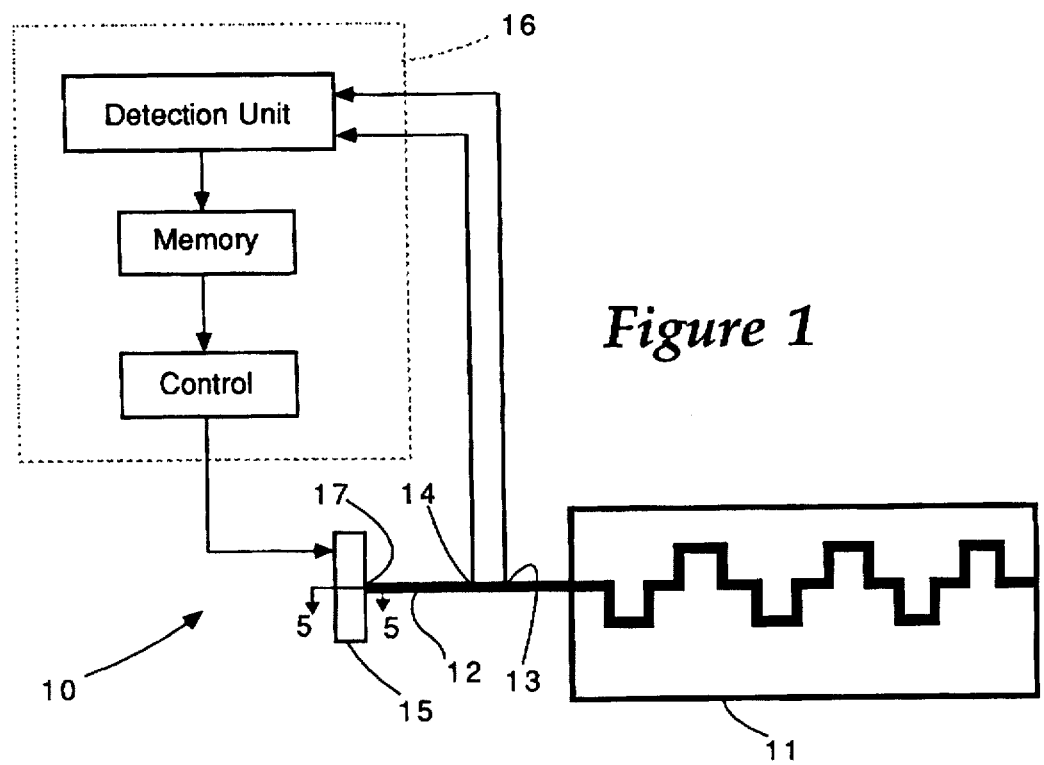
FIGS. 1–4 are schematic views showing four different applications of the present invention in relation to a rotating shaft driven by a reciprocating machine.

Referring now to FIG. 1, an automated active torsional vibration dampening system 10 is schematically shown for illustrative purposes in conjunction with an internal combustion engine 11 having a crank shaft 12. Because of inherent mass properties, crank shaft 12 has a plurality of potentially damaging excitable natural frequencies. Depending upon such factors as the operating range of the engine and the firing sequence of the individual cylinders, only a relatively small number of the crank shaft's natural frequencies are capable of potential excitation. Each potentially excitable frequency corresponds to a resonance mode that has a number of node locations along the length of the shaft. For instance, in a mode one vibration, a node would exist somewhere between the ends of the shaft, and the shaft would twist back and forth at the natural frequency on each side of the node location. Higher resonance modes have a correspondingly greater number of node locations along the length of the shaft.

Figure 2:
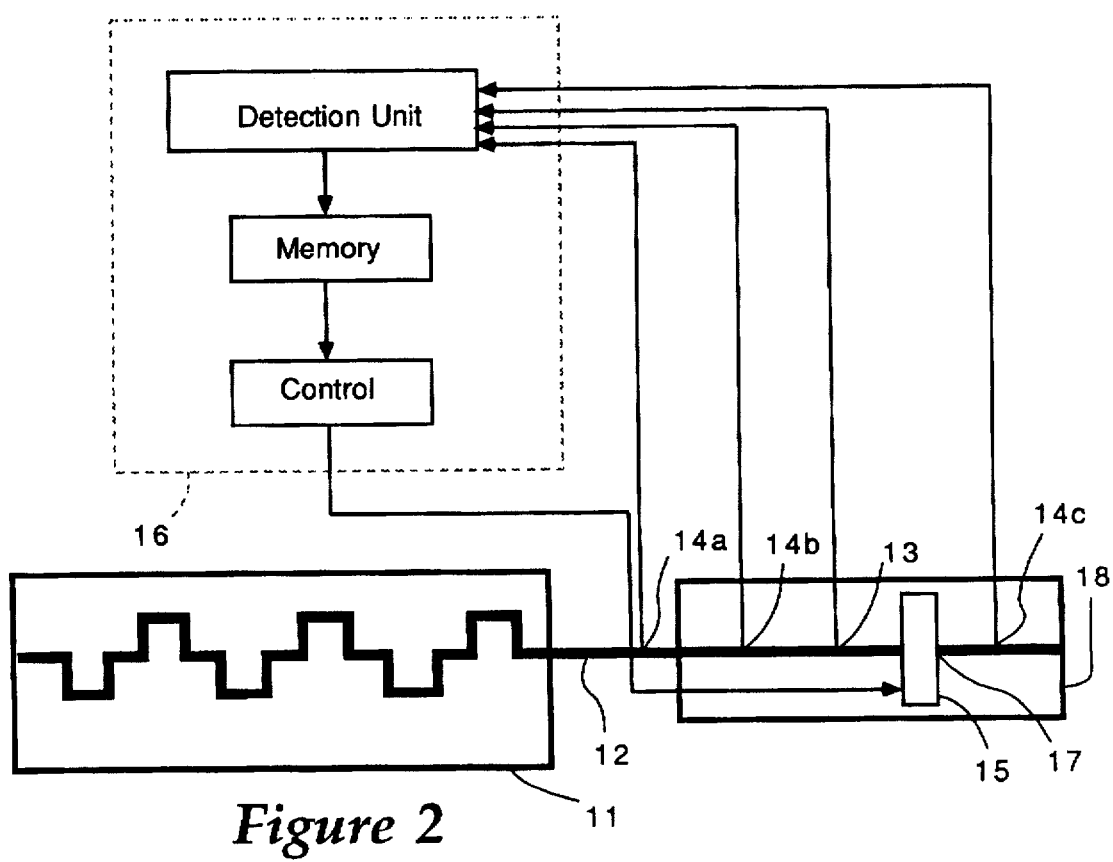
Figure 3:
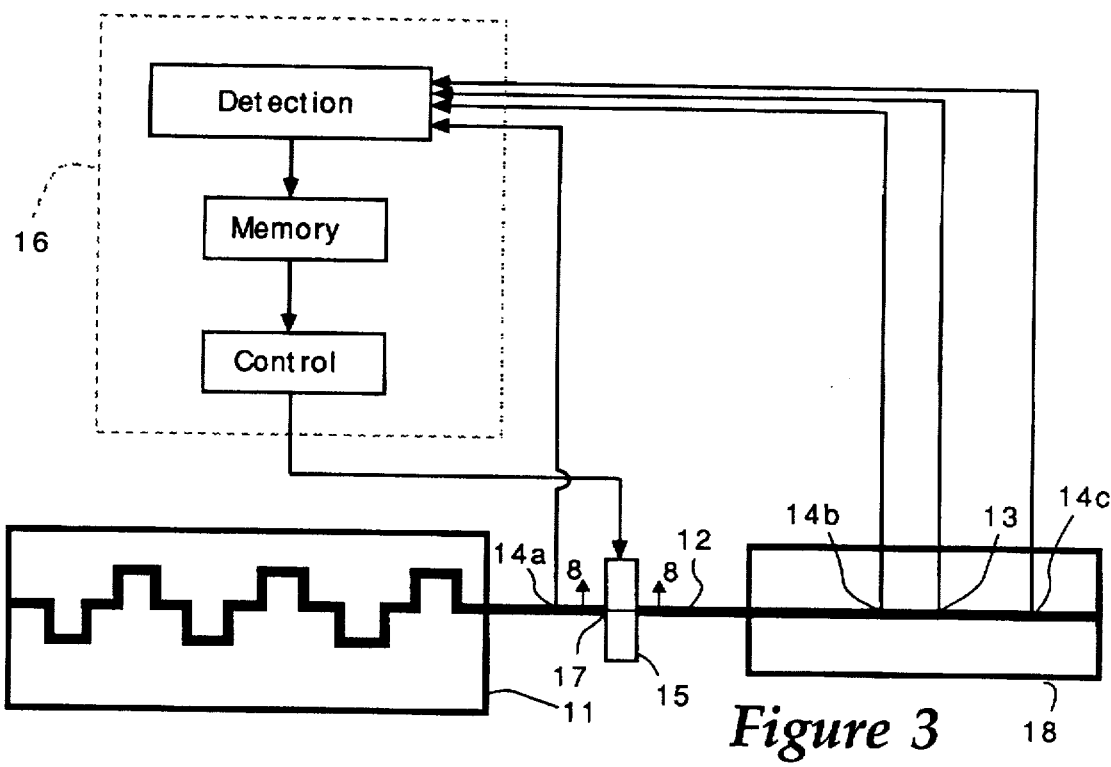
Figure 4:
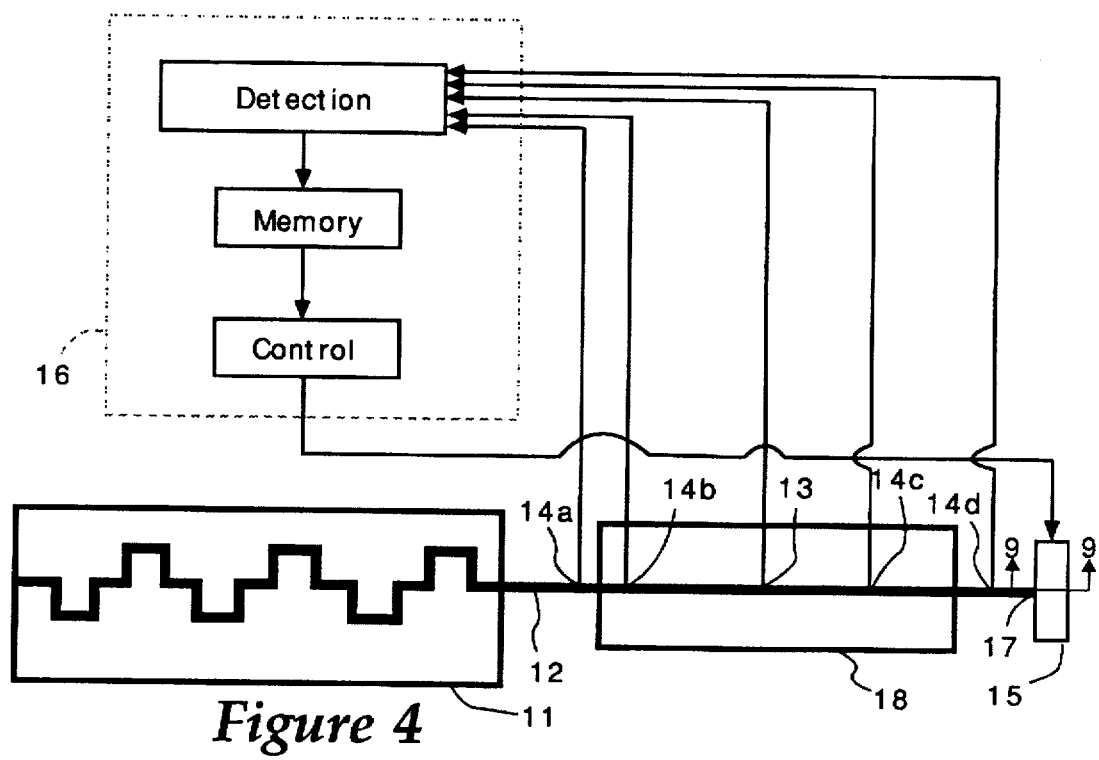

A tachometer sensor 13 continuously measures the mean rotational speed of the shaft so that computer 16 can determine the operating condition of engine 11. A torsional vibration amplitude sensor 14 continuously measures the energy of the torsional vibration at another location along the length of shaft 12. The energy of the torsional vibration at the sensor location can be determined either by using a torsional stress sensor or a torsional vibration angular amplitude sensor. In the first version, the stress sensor is preferably located at or near a node location along the shaft since the node experiences the highest stress during a torsional vibration. In the latter version, the angular amplitude sensor must be located somewhere other than a node location since the shaft exhibits no angular twist deviation at the node location. While it is conceivable that the present invention could successfully operate with a single strategically located vibration energy sensor, FIGS. 2–4 illustrate that the invention prefers a plurality of vibration energy sensors at various locations along the length of the torque transmitting member. The speed and vibration energy measurements are periodically sampled by a computer control system 16 which can be thought of as housing a torsional vibration detection unit, a memory unit, and a control unit.

The present invention is not particularly concerned with torsional vibrations present in the system that have a magnitude less than that capable of causing torsional fatigue damage to the torque transmitting member. Therefore, unless the torsional vibration detection unit detects a torsional vibration of sufficient energy to cause damage to the shaft, no action will be taken by the present invention to damp out the low level vibrations present in the system. Nevertheless, the present invention could be utilized for damping any torsional vibration that could potentially be harmful to a particular system. The memory unit preferably stores a plurality of past measurements for both the vibration energy and the rotational speed of the shaft. This information allows the control unit to accurately predict the amplitude, phase and frequency of the torsional vibration at damper location 17, where the active damper 15 is attached to shaft 12. With this prediction, the control unit orders the active damper 15 to impart a torsional impulse at the damper location 17 while the torsional vibration at that location is between its peak angular amplitudes.

The timing of each torsional impulse is extremely important since periodic impulses at the wrong time and/or in the wrong direction could actually induce resonance vibrations in the system. Therefore, it is important that shaft 12 be in the process of twisting at the time that the torsional impulse is applied. Preferably, the torsional impulse is applied over a short duration at about the time that the shaft is twisting through a zero deflection angle at the damper location 17. In other words, the torsional impulse is preferably applied over a relatively short duration when the shaft is twisting at its maximum speed between peak angular amplitudes of the torsional vibration. In some applications, it may be desirable to apply a counter torque during the complete time period when the torque transmitting member is twisting between peak angular amplitudes at the damper location.

A given resonance mode in crank shaft 12 may only be excitable at or around a certain rpm for the engine. Thus, one method of performing the damping method of the present invention is to empirically determine which operating conditions of the particular system (rpm for an engine) excite which resonance mode. One can also empirically determine the phase shift of the torsional vibration between a sensor location and the damper location. With this information, a "look-up" table can be prepared and stored in the computer which allows the computer to identify the frequency of the resonance torsional vibration by knowing the operating condition of the system, and allows the computer to predict when the torsional vibration will be between peak angular amplitudes at the damper location. Thus, when the vibration energy sensor senses a torsional vibration of sufficient energy to damage or disrupt the system, the computer predicts the frequency and phase of the torsional vibration at the damper location. The computer then periodically commands active damper 15 to impart torsional impulses in the opposite direction to the twisting motion from the torsional vibration when the vibration is between peak angular amplitudes at the damping location. Of course, the torsional impulses are of a sufficient energy to damp the resonance vibration and are typically imparted to the system at a frequency about equal to that of the resonance frequency. In other words, active damper 15 periodically imparts small but precisely timed torsional impulses to the shaft to damp or otherwise prevent the resonance vibration from exceeding a magnitude that would cause torsional fatigue damage to the shaft.

FIGS. 2–4 are schematics similar to that of FIG. 1 showing the flexible applicability of the present invention to various locations along a torque transmitting shaft 12. While the present invention is being illustrated in relation to an internal combustion engine 11, it is equally applicable to any member capable of transmitting a torque, including pulse driven shafts, pumps, compressors, gears, motors, and non-rotating members capable of transmitting a torque. In FIGS. 2–4, an item of driven machinery 18 is attached to, and driven by, rotating shaft 12. In FIG. 2, three vibration energy sensors 14a–c are mounted at various locations along shaft 12. A plurality of vibration energy sensors are preferably utilized in order to make the system more robust in its ability to detect potentially damaging torsional vibrations. In the case of angular amplitude sensors, at least one of the sensors must be located at a non-node location for a given resonance mode in order for a torsional vibration at that resonance frequency to be detected. The active damper 15 of FIG. 2 is incorporated into the driven machine 18. FIG. 3 shows an example in which the tachometer 13 and two amplitude sensors 14b–c are located within the driven machinery 18, but the active damper 15 is actually mounted at a damper location 17 between engine 11 and machine 18. FIG. 4 shows an example in which active damper 15 is attached to one end of driven shaft 12 that extends beyond one end of driven machinery 18.

FIGS. 1–4 illustrate that one key aspect of the invention is to locate the vibration energy sensors and the active damper at several locations along the length of the shaft. It is important to note that the damper must be located at a non-node location in order to have the ability to damp a resonance torsional vibration corresponding to a particular resonance mode. In some applications, due to the relatively large number of potentially excitable resonance modes, a plurality of active dampers would have to be utilized. This is because it may prove extremely difficult to locate a single damper at a location far enough away from all the nodes of all the resonance modes to have the ability to deliver counter torsional impulses of an energy sufficient to damp the system. In other words, a single active damper actuator may be highly effective for one resonance mode but almost useless with respect to a different resonance mode.

Figure 5:
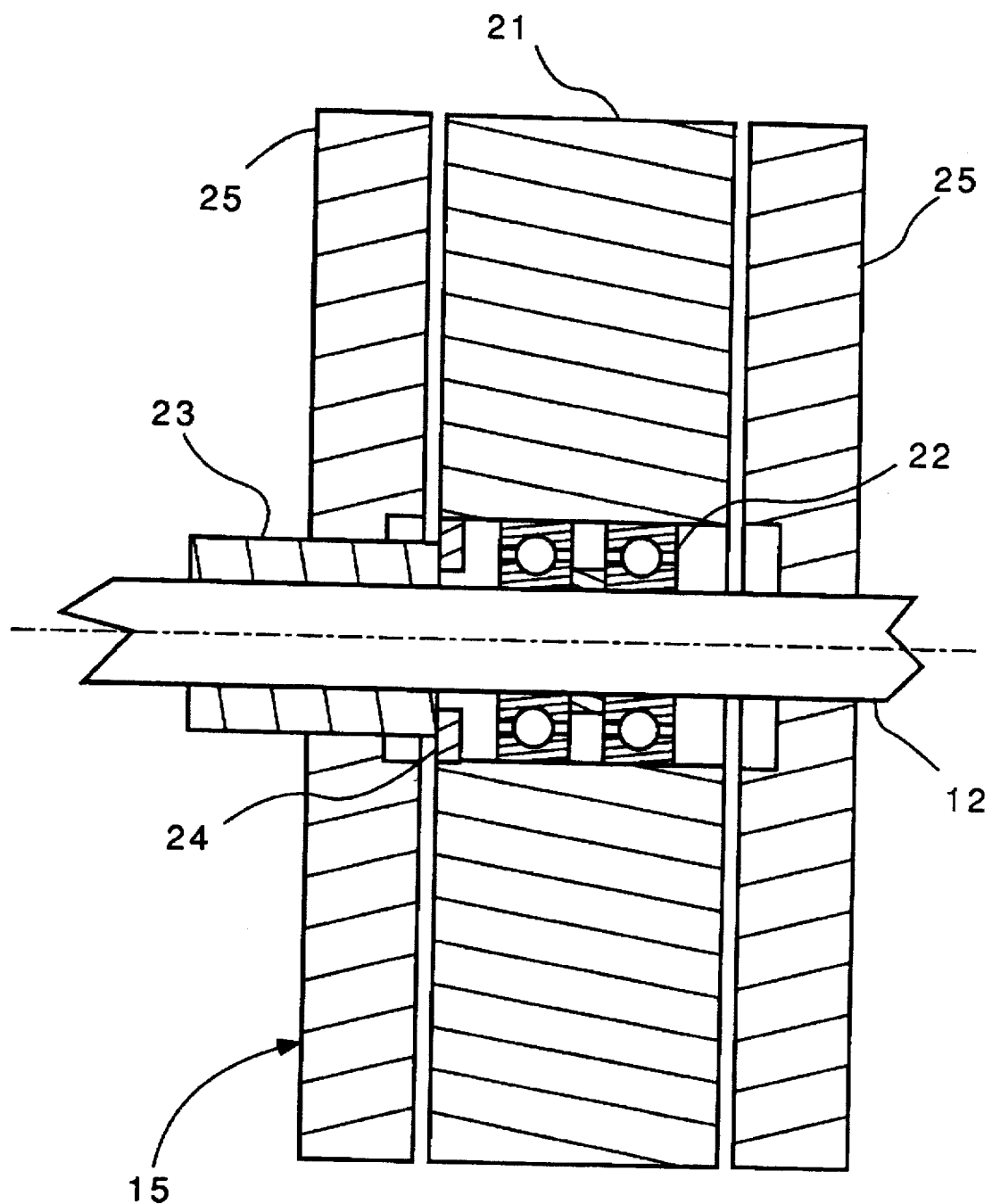
FIG. 5 is a side sectional view of an active damper actuator for a damping system according to one embodiment of the present invention.

Referring now to FIG. 5, the structure of active damper actuator 15 is illustrated. In this embodiment, no enclosed housing is utilized in order to better facilitate heat dissipation. FIG. 5 corresponds to the active damper 15 illustrated in FIG. 1. A flywheel 21 is mounted on bearings 22 so that it is capable of rotating with respect to shaft 12 on the same axis of rotation. A small motor 23 mounted on shaft 12 maintains flywheel 21 at or above a specific rotation rate relative to shaft 12 via driveshaft 24. An eddy current brake 25 is attached to rotate with shaft 12 adjacent to flywheel 21. The eddy current brake has the ability to apply torsional impulses to flywheel 21 by momentarily coupling the flywheel to the shaft. By doing so, shaft 12 absorbs an equal and opposite torsional impulse whenever the eddy current brake is actuated to slow the relative rotation of flywheel 21. Thus, actuator 15 is an energy exchanging device operably connected to the member at damping location 17. Energy exchanges are accomplished by imparting torsional impulses to the member. In one preferred embodiment, flywheel 21 is spun at an angular rate at least 100 times faster than that of rotating shaft 12 in order to reduce the mass of the damping system while maintaining an adequate reservoir of angular momentum in flywheel 21 to overcome the expected resonance vibrations of the system.

Figure 6:
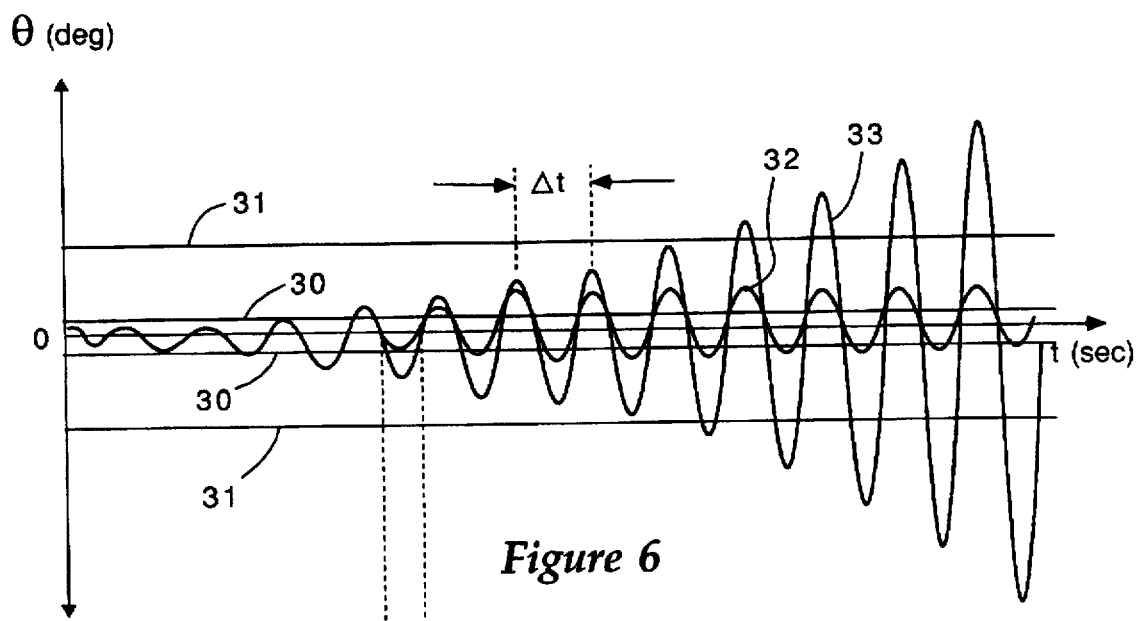
FIG. 6 is a graph of angular amplitude versus time showing the amplitude of a torsional vibration in a rotating shaft with and without the present invention.

Referring now to FIG. 6, the angular amplitude data of a torsional vibration present in the system at the damper location is graphed against time. Line 33 shows the build up of a resonance vibration within the shaft at one of the shaft's natural frequencies corresponding to $1/\Delta t$. As can be seen, with each cycle the vibration grows in amplitude until it exceeds a threshold amplitude 31 which would cause torsional fatigue damage to the given shaft. In other words, as long as the torsional vibrations in the shaft are kept below threshold level 31, the engine could expect to suffer little or no long term torsional fatigue damage due to the low level vibrations present. Line 32 shows the presence of the same vibration at the same location when the present invention is activated to damp the resonance vibration. In particular, when the present invention senses that the vibration has exceeded a minimum threshold value 30, the active damper is actuated to input dampening torsional impulses 34 according to the periodic schedule illustrated in FIG. 7. It is important to note that each torsional impulse 34 occurs while the torsional vibration at the damper location is between its peak angular amplitudes, and preferably it occurs when the shaft is twisting through a zero angular deflection at the damper location.

Figure 8:
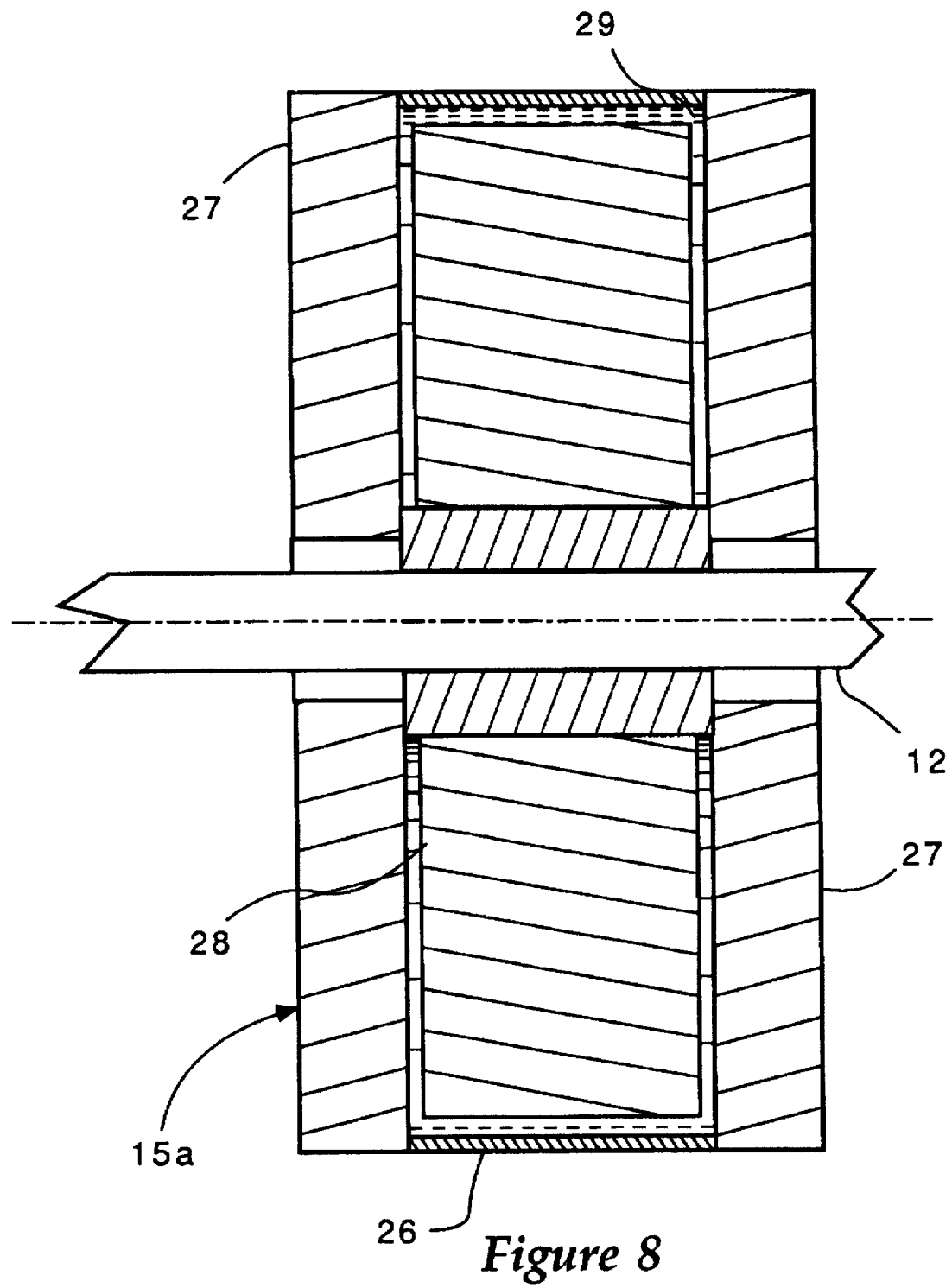
FIG. 8 is a side sectional view of an active damper actuator for a damping system according to another embodiment of the present invention.

FIG. 8 illustrates an alternative damper actuator 15a according to another embodiment of the present invention. In this case, a ring mass 28 having a relatively large moment of inertia is mounted within a doughnut shaped housing 26 that is fixedly attached to shaft 12. Ring mass 28 is free to rotate within housing 26. A magnetorheological fluid 29 is in contact with the outer wetted surface of ring mass 28 and the inner wetted surface of housing 26. A portion of housing 26 is made up of an electromagnet assembly 27 that has the ability to increase the shear strength of the fluid, and preferably to generate a magnetic field of a sufficient strength in the housing that the magnetorheological fluid can be solidified. While in operation, the computer commands the electromagnet assembly 27 to increase the shear strength of the fluid for a portion of each vibration cycle when the shaft is twisting between its peak angular amplitudes. Thus, actuator 15a is also another example of an energy exchanging device according to the present invention. Like the earlier embodiment, energy is exchanged via the application of torsional impulses to the torque transmitting member.

Figure 7:
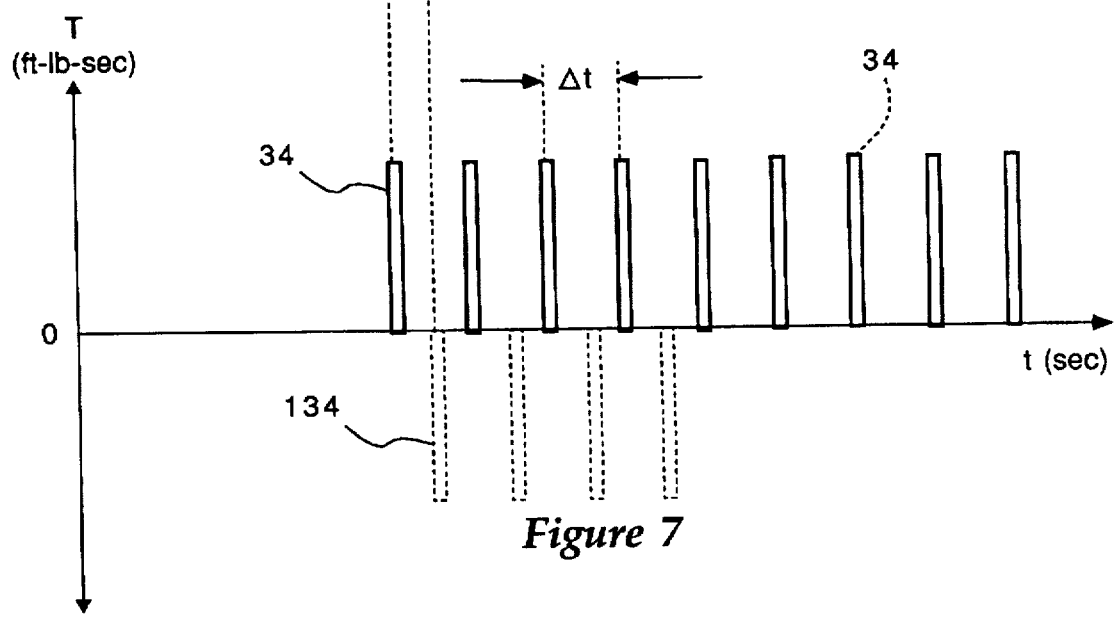
FIG. 7 is a graph of the torsional impulse pattern delivered to the rotating shaft over time according to one aspect of the invention.

This periodic viscosity increase of the magnetorheological fluid causes the shaft to momentarily increase the drag on the inertia ring with precise timing so that the inertia ring absorbs a small amount of angular momentum from shaft 12. In some applications, it may be desirable to generate a magnetic field of sufficient strength to solidify the fluid in order to obtain a larger torsional impulse. Unlike the earlier embodiment, damper actuator 15a has the ability to apply a torsional impulse efficiently twice per vibration cycle; one impulse is applied when the shaft is twisting through zero angular deflection going one direction and the second impulse is applied when the shaft is twisting back through zero deflection in the opposite direction. FIG. 7 illustrates such a case when torsional impulses 34 combined with torsional impulses 134. In some applications, such as fast rotating shaft, the vibration frequency may not be high enough to permit two damping impulses per cycle. In any event, in order to damp a vibration, there must be some relative rotation between the ring mass and the shaft, and this relative rotation must be in a direction opposite to the direction of the twist motion from the vibration at the moment the torsional impulse is applied. As an alternative, this embodiment could utilize an appropriate electrorheological, photorheological, ultrasonicrheological or radiographicrheological damping fluid.

Figure 9:
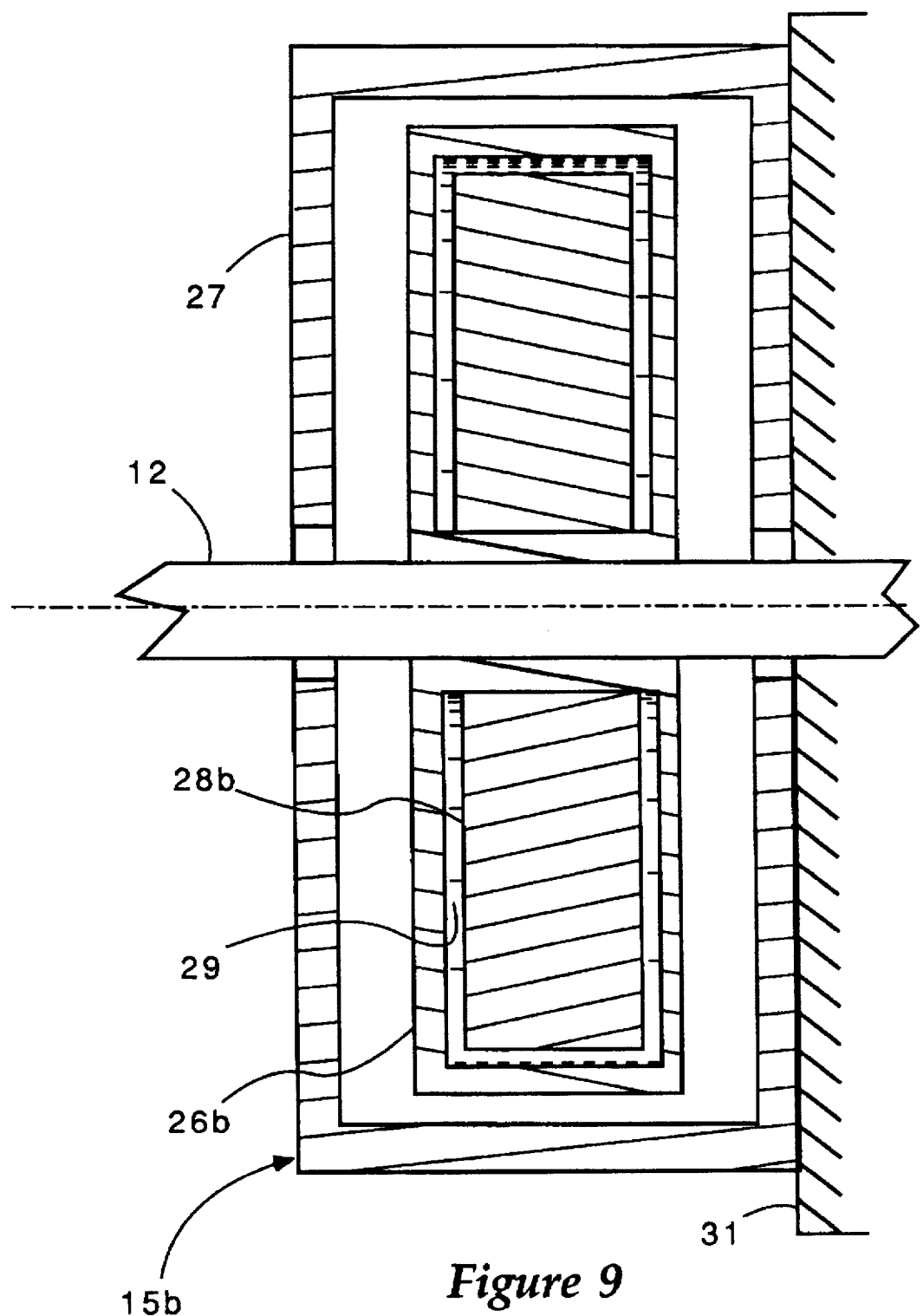
FIG. 9 is a side sectional view of an active damper actuator according to still another embodiment of the present invention.

FIG. 9 shows still another damper actuator 15b according to the present invention. In this case, electromagnet assembly 27 is fixedly attached to a non-rotating portion of the system, such as an engine block 31. Like the embodiment of FIG. 8, an inertial ring mass 28b is free to rotate within a doughnut shaped housing 26b. A magnetorheological fluid 29 fills the space between the inner wetted surface of housing 26b and the outer wetted surface of inertial mass ring 28b. Like the previous embodiment, generation of a magnetic field of a sufficient strength over brief periods with specific timing enables the shaft to briefly increase the drag on the inertial mass ring 28b enabling a torsional vibration in the shaft to be damped.

Figure 10:
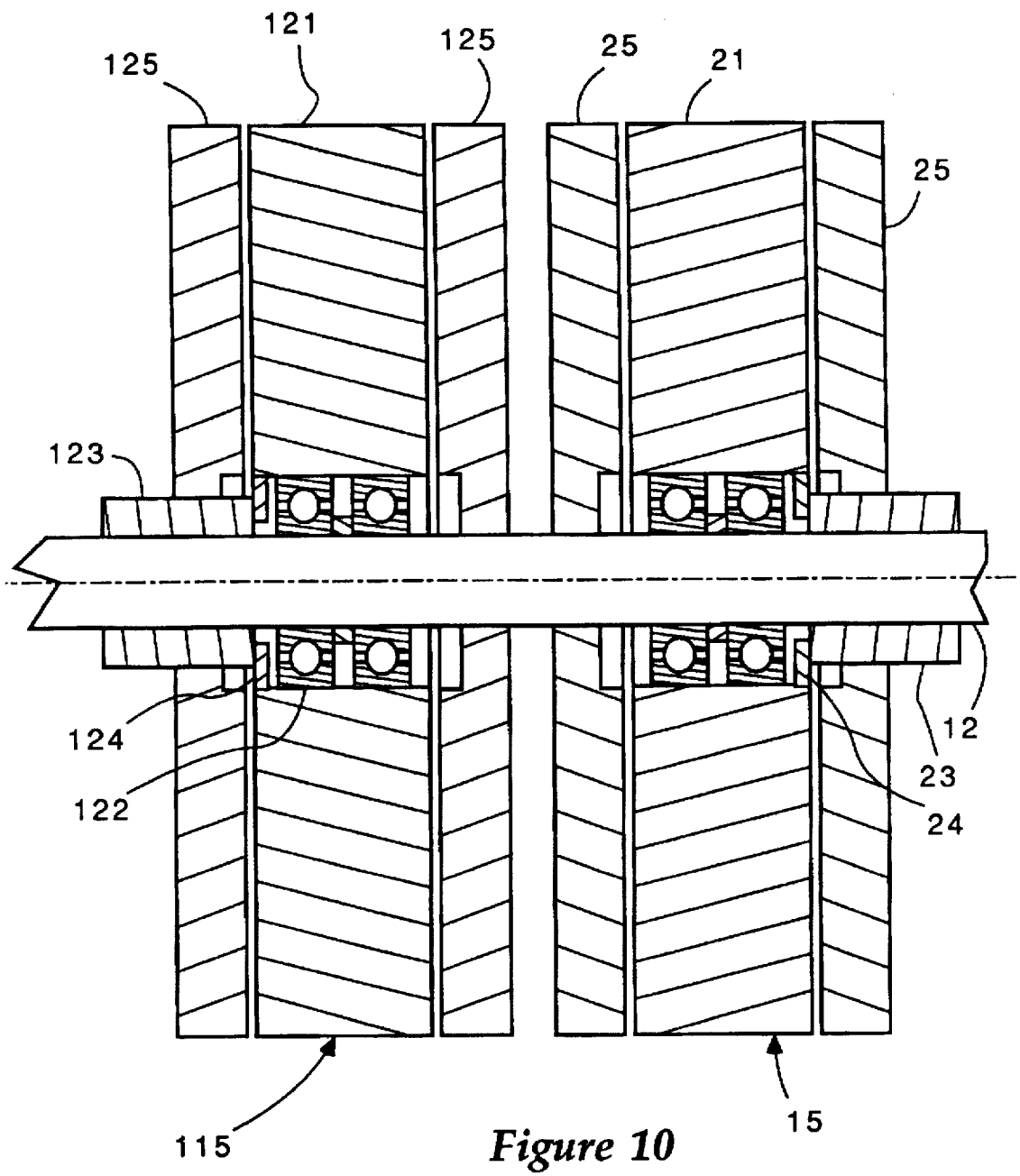
FIG. 10 is a side sectional view of a dual flywheel damper actuator according to another embodiment of the present invention.

FIG. 10 shows a dual flywheel embodiment of the present invention having a first damper actuator 15 that is substantially identical to the damper actuator 15 described earlier in relation to FIG. 5. In this case, a second damper actuator 115 includes a flywheel 121 rotating on bearings 122 with respect to shaft 12 in a structure similar to that of actuator 15. However, in this case, motor 123 rotates flywheel 121 via driveshaft 124 in a direction opposite to that of flywheel 21. Each damper actuator 15 and 115 imparts a torsional impulse to shaft 12 once per vibration cycle. This action is illustrated in FIG. 7 by damper actuator 15 imparting a torsional impulse 34 when the shaft is twisting in one direction between peak angular amplitudes and the second damper actuator 115 imparting a torsional impulse 134 a half period later when the shaft is twisting back in the opposite direction between peak angular amplitudes. Flywheels 21 and 121 are preferably spun at high speeds relative to that of shaft 12 so that the overall weight of the system can be reduced. Furthermore, the inclusion of two dampers spinning in opposite directions allows the overall weight of the system to be halved once again since each damper actuator need only have the ability to supply half the damping energy necessary to damp a given resonance torsional vibration.

The present invention has been illustrated as utilizing a computer having a "look-up" table having phase information and vibration frequency predictions. In addition to gathering data for the "look-up" table empirically as discussed before, in some situations it may be possible to prepare such a "look-up" table using available computer tools that have the ability to identify resonance modes, node locations and other information based upon inputted mass properties and stiffness characteristics of the system. The method of the present invention could also be accomplished by using either a highly sensitive tachometer or a vibration energy sensor that is sampled at such high frequencies by the computer that the computer would have the ability to identify both the frequency and magnitude of a torsional vibration by storing and comparing a plurality of measurements over time. Thus, depending upon the speed of the computer, the complexity of the system, the number of sensors and their locations and other factors, the method of dampening according to the present invention could be accomplished utilizing a variety of hardware components that are suited to a variety of different system requirements. For instance, in some cases it may be necessary to damp all torsional vibrations of a given system in order to prevent disruption of sensitive components, while other systems simply need protection against high amplitude resonance torsional vibrations that could cause fatigue damage or otherwise tear the given system apart.

It should be clear that various modifications can be made to the present invention as herein above described and many apparently different embodiments of the same can be made within the spirit of the invention without departing from the scope of the attached claims. For example, apart from the energy exchanging devices described above, a myriad of other potential energy exchanging devices could be used in accordance with the present invention. One specific example might be the use of a rotating liquid reservoir that surrounds the torque transmitting member. In any event, it is intended that the above description serve only to aid in the understanding of the invention and is not intended to limit the legal scope of the patent which is defined solely by the claims as set forth below.

I claim:

1. A resonance torsional vibration damping system comprising:

a member having a length and at least one node location along said length;

an energy exchanging device operably connected to said member at a damping location that is a distance away from said at least one node location, and being capable of exchanging energy with said member by imparting a plurality of successive torsional impulses to said member;

means for detecting a resonance torsional vibration in said member; and a computer in communication with said energy exchanging device and said detecting means, and being capable of controlling said energy exchanging device.

2. The resonance torsional vibration damping system of claim 1, wherein said energy exchanging device includes a flywheel capable of rotating with respect to said member, means for rotating said flywheel with respect to said member, and a brake mounted at said damper location on said member and being capable of coupling said member to said flywheel; and said means for detecting includes means for measuring an energy of said resonance torsional vibration at a sensor location along said member.

3. The resonance torsional vibration damping system of claim 2, wherein said means for measuring an energy includes an angular amplitude sensor capable of measuring an angular amplitude of said resonance torsional vibration at said sensor location.

4. The resonance torsional vibration damping system of claim 2, wherein said means for measuring an energy includes a torsional stress sensor capable of measuring a torsional stress in said member at said sensor location.

5. The resonance torsional vibration damping system of claim 2, wherein said brake is an eddy current brake in field contact with said flywheel.

6. The resonance torsional vibration damping system of claim 2, wherein said flywheel rotates at least 100 times faster than said member.

7. The torsional vibration damping system of claim 2, wherein said energy exchanging device further includes a second flywheel capable of rotating with respect to the member, means for rotating said second flywheel in the opposite direction to said first flywheel, and a second brake mounted at a second damper location on the member and being capable of coupling the member to said second flywheel; and said computer also being in communication with and capable of controlling said second brake.

8. The damping system of claim 1, wherein said energy exchanging device includes a housing fixedly mounted on the member and having a sealed inner chamber bounded by an inner wetted surface, a mass having a moment of inertia and an outer wetted surface positioned within said sealed inner chamber and being free to rotate about said axis with respect to said housing and the member, a magnetorheological fluid in said sealed inner chamber contacting said inner wetted surface of said housing and said outer wetted surface of said mass, and means for periodically generating a magnetic field of sufficient strength to momentarily increase the shear strength of said magnetorheological fluid while the torsional vibration is twisting between peak angular amplitudes; and said means includes means for measuring the rotational speed of the member at a first location, and means for measuring the energy of a torsional vibration at a second location along the length of the member.

9. The torsional vibration damping system of claim 8, wherein said energy measuring means is a sensor capable of measuring the angular amplitude of a torsional vibration at said second location.

10. The torsional vibration damping system of claim 8, wherein said energy measuring means is a sensor capable of measuring the torsional stress in the member at said second location.

11. A resonance torsional vibration damping system comprising:

a member;

means for detecting a resonance torsional vibration in said member;

means for estimating time periods when said resonance torsional vibration is between peak angular amplitudes at a damping location;

means for imparting a plurality of successive torsional impulses to said member at said damping location, wherein each of said torsional impulses being imparted over a portion of one of said time periods in a direction opposite to a twisting motion from said resonance torsional vibration; and means for sizing said torsional impulses to have sufficient energy to damp said resonance torsional vibration such that said peak angular amplitudes are maintained less than a threshold amplitude.

12. The resonance torsional vibration damping system of claim 11, wherein said means for detecting includes:

means for measuring a magnitude of said resonance torsional vibration for at least one location along said member; and means for determining whether said magnitude exceeds a threshold value.

13. The resonance torsional vibration damping system of claim 11, wherein said means for estimating includes:

means for identifying what operating conditions of said system said member excite resonance torsional vibrations;

means for measuring a frequency of said resonance torsional vibration at each of said operating conditions;

means for storing said frequency for each of said operating conditions; and means for sensing said operating condition of said system when a resonance torsional vibration is detected.

14. The resonance torsional vibration damping system of claim 13, wherein said means for estimating includes:

means for ascertaining a damping effectiveness between successive torsional impulses;

means for adjusting a timing of subsequent torsional impulses so that said time period is between peak angular amplitudes of said resonance torsional vibration at said damping location.

15. The resonance torsional vibration damping system of claim 13, wherein said means for sensing includes means for sensing a rotation speed of said member.

16. The resonance torsional vibration damping system of claim 11, wherein said means for detecting includes:

means for periodically measuring an energy of said resonance torsional vibration for at least one location along said member; and means for periodically comparing an energy measurement to a threshold energy value.

17. The resonance torsional vibration damping system of claim 16, wherein said means for periodically measuring includes means for measuring a torsional stress in said member.

18. The resonance torsional vibration damping system of claim 16, wherein said means for periodically measuring includes means for measuring an angular amplitude of said resonance torsional vibration for at least one location along said member.

* * * * *